Patented Oct. 8, 1940

2,216,827

UNITED STATES PATENT OFFICE 2,216,827

CELLULOSE DERIVATIVE COMPOSITIONS OF MATTER AND ARTICLES PRODUCED THEREFROM

James A. Mitchell, Kenmore, N. Y., assignor to E. I. du Pont de Nemours & Company, Wilmington, Del., a corporation of Delaware No Drawing. Application September 26, 1939, Serial No. 296,614

40 Claims. (Cl. 91—68)

This invention relates to cellulose derivative compositions and articles produced therefrom. More particularly, this invention relates to moistureproofing compositions and to the articles produced therefrom.

With the modern trends in the development of the packaging of commodities, especially perishable foodstuffs, the need has arisen for a wrapping material which can at once provide physical protection against contamination, preservation action by retaining within the package the original conditions, such as moisture content, and sales appeal by permitting examination of the package contents without destroying the wrapper. These needs have been largely fulfilled by the recent introduction to the trade of a wrapping material comprising a transparent base sheet, such as regenerated cellulose, coated with a transparent moistureproofing composition, which latter may in one form thereof comprise a cellulose derivative and a wax, with or without a resin or blending agent, and preferably also a plasticizer.

These moistureproof wrapping materials are furnished to the consumer in the form of continuous roll stock or as cut-to-size sheets. In order that the roll stock will unroll smoothly or the cut-to-size sheets separate easily, the surface of the material must be smooth and non-tacky, and there must be no tendency towards caking or sticking together during the time of storage which intervenes between manufacture and consumption. The moistureproofing composition, on the other hand, must be flexible, transparent, and have good surface characteristics.

In my copending application Serial No. 205,196, filed April 30, 1938, there is disclosed cellulose derivative compositions, and particularly moistureproofing cellulose derivative compositions, containing as a plasticizer a monoaryl derivative of an amide of a (saturated) fatty acid containing 6 to 10 carbon atoms, and specifically an N-monophenyl derivative of an amide of a (saturated) fatty acid containing 6 to 10 carbon atoms. In copending application of Robert B. Flint, Serial No. 205,250, filed April 30, 1938, there is disclosed cellulose derivative compositions, and particularly moistureproofing cellulose derivative compositions, containing as a plasticizer a polyaryl derivative of an amide of a (saturated) fatty acid containnig 6 to 18 carbon atoms, and specifically an N-diphenyl derivative of an amide of a (saturated) fatty acid containing 6 to 18 carbon atoms. I have now found that aryl amides of unsaturated aliphatic acids containing 3 to 24 carbon atoms are effective plasticizers for cellulose derivative compositions and that such plasticizers are particularly useful in moistureproofing compositions containing cellulose derivatives.

It is, therefore, an object of this invention to provide a new cellulose derivative composition containing, as a plasticizer, an aryl amide of an unsaturated aliphatic acid containing 3 to 24 carbon atoms.

Another object of this invention comprises the production of a moistureproof film which fulfills the requirements for flexibility, transparency, and additionally possesses the desired surface characteristics, such as a high degree of surface smoothness, slip, and resistance to sticking under storage conditions.

Further objects of the invention will appear from the following description and appended claims.

This invention, in its preferred embodiment, is primarily concerned with moistureproofing compositions for the production of films (either as a coating on a selected base, or as a self-sustaining film) comprising a cellulose derivative, a moistureproofing agent, a plasticizer, and preferably also a resin or other blending agent. The term "moistureproofing agent" defines the material which serves as the basis for moistureproofness. In the formulation of cellulose derivative coating compositions, it is well known in the art to use a plasticizing agent to impart flexibility to the coating. This is also true in the formulation of cellulose derivative coating compositions which contain moistureproofing agents, but it has been observed that the plasticizer also contributes to the moistureproofing property, and, for the production of highly moistureproof coating compositions, more plasticizer is employed than is necessary merely for its plasticizing action. The use of excess plasticizer to accomplish this function, however, tends to impair the surface characteristics of the moistureproofing coating compositions since, with increased plasticizer content, the composition becomes softer and stickier. The softness and stickiness are objectionable from the point of view of good surface slip and storage.

For the purposes of this invention, moistureproof materials are defined as those which, in the form of a thin, continuous and unbroken sheet or film, will permit the passage of not more than 690 grams of water vapor per 100 square meters per hour over a period of 24 hours at approximately 39.5° C.±0.5° C., the relative humidity of the atmosphere at one side of the film being maintained at least at 98% and the relative humidity of the atmosphere at the other side being maintained at such value as to give a humidity differential of at least 95%.

Moistureproofing coating compositions are defined as those which, when laid down in the form of thin, continuous, unbroken films, applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.) with a water vapor differential of 50-55 mm. (preferably 53.4±0.7 mm.) of mercury. For convenience, the number of grams of water vapor passed under these conditions may be referred to as "permeability value". An uncoated sheet of regenerated cellulose having a thickness of approximately 0.0009" will show a permeability value of the order of 6900.

In the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

The composition may be coated onto the base to give a wide range of coating thicknesses and, where heat sealing is desired, increase in the coating thickness will increase the heat sealing property of any given composition. For the purpose of this invention, and particularly where the ultimate coated sheet material is to be used as a wrapping tissue, the coating thickness is 0.00002" to 0.0005" and preferably 0.00005" on each side of the base.

In connection with this invention, it has been found that there are certain plasticizers for cellulose derivatives, especially in cellulose derivative moistureproofing agent compositions, which are unique in their ability to plasticize and provide excellent surface and storage characteristics. Though these plasticizers are not moistureproofing agents per se, they tend in cellulose derivative moistureproofing agent coating compositions to increase moistureproofness. The plasticizers which possess these unique properties are aryl (mono or poly) amides of unsaturated aliphatic acids containing 3 to 24 carbon atoms. The plasticizers of the instant invention may be used alone or in combination with other known plasticizers to produce moistureproof films which exhibit a high degree of moistureproofness, good appearance, flexibilty, transparency, excellent surface slip, and storage without sticking or marring.

Generally speaking, the compositions embodied in this invention comprise aryl (mono or poly) amides of unsaturated aliphatic acids containing 3 to 24 carbon atoms in combination with a cellulose derivative, a moistureproofing agent, and preferably a resin or blending agent. In addition, other plasticizers, drying or non-drying oils, additional resinous material of either the natural or synthetic varieties, coloring agents either as dyes or pigments, or other modifying agents may be used according to the type of coating composition desired. Obviously, for those uses where a transparent coated material is desired, any pigments or modifying agents which impair the transparency of the coating composition will be omitted therefrom. The proportions of the several ingredients may vary within rather wide limits depending on the properties desired in the finished composition, and these will be more specifically set forth below and will be illustrated in the several examples.

As previously mentioned, the plasticizers contemplated by this invention are aryl (mono or poly) amides of unsaturated aliphatic acids containing 3 to 24 carbon atoms, which are not moistureproofing agents per se. Though various aryl derivatives of amides of unsaturated aliphatic acids containing 3 to 24 carbon atoms may be used, I have secured satisfactory results using N-substituted mono- or diaryl amides of unsaturated aliphatic acids containing 3 to 24 carbon atoms. As illustrative examples of the plasticizers contemplated by this invention may be mentioned the N-substituted aryl amides prepared from mono-basic unsaturated aliphatic acids containing 3 to 24 carbon atoms, such as produced from the following acids: acrylic, methyl-acrylic, dimethyl-acrylic, crotonic, angelic, sorbic, oleic, linoleic, linolenic, erucic, ricinoleic, acetylated ricinoleic, clupanodonic, myristolenic, palmitolenic, elaeostearic, undecylenic, stearolic, C-20 acids with 3 or 4 double bonds, and unsaturated acids derived from natural oils, such as cottonseed oil, corn oil, linseed oil, olive oil, rapeseed oil, sunflower oil, China-wood oil, soya-bean oil, and marine oils, such as menhaden, porpoise, whale oil, etc.

As illustrative and preferred species of the N-substituted monoaryl amides of unsaturated aliphatic acids containing 3 to 24 carbon atoms may be mentioned the N-monophenyl derivatives of amides of said acids, and specifically monophenyl ricinoleamide, monophenyl oleamide, and monophenyl C-20 acid. As illustrative and preferred examples covering the N-substituted polyaryl amides of unsaturated aliphatic acids containing 3 to 24 carbon atoms may be mentioned the N-diphenyl derivatives of amides of said acids, and specifically diphenyl oleamide, diphenyl linoleamide, and diphenyl ricinoleamide.

The plasticizers may be prepared by reacting an aryl amine, such as diphenyl amine or aniline, with the acid or the acid chloride under suitably controlled conditions or by other methods known in the art. Thus, materials which are capable of polymerization or oxidation may be used, if desired, after partial or complete oxidation or polymerization. Driers may be incorporated in the composition to insolubilize and harden it.

The plasticizers constituting the instant invention, particularly those obtained from the higher acids, are very effective in promoting moistureproofness in cellulose derivative moistureproofing compositions. They materially aid in producing films with good surface characteristics. Those plasticizers having drying properties may, after application of the composition containing the same, be cured to improve hardness, adhesion and anchorage.

As additional plasticizers for use in combination with those of this invention may be mentioned any of the known plasticizers, such as dibutyl phthalate, dilauryl phthalate, cyclohexyl butyl phthalate, di-(methylcyclohexyl) phthalate, di-(dimethylcyclohexyl) phthalate, methyl-(dimethylcyclohexyl) adipate, dicyclohexyl adipate, tricresyl phosphate, esters of o-benzoyl benzoic acid, such as butyl benzoyl benzoate, derivatives of toluene sulfonamide, or the like.

As moistureproofing agents, waxes or wax-like materials, such as paraffin, petrolatum, ceresin, Japan wax, palm wax, beeswax, certain chlorinated hydrocarbons, Chinese insect wax, or other synthetic waxes or wax-like materials may be used. If some of these waxes are too soft for the purposes desired, they may be mixed with harder waxes of the group or with carnauba wax, candelilla wax or other harder waxes. Generally, paraffin serves as a satisfactory moistureproofing agent which may be hardened if necessary by admixture with carnauba or candelilla wax. In the examples which accompany this specification, paraffin having a melting point of at least 60° C. has been employed as typical of a highly satisfactory moistureproofing agent, but it is to be understood that other moistureproofing agents may be substituted.

As the cellulose derivative, there can be used cellulose ethers, such as glycol, ethyl, or benzyl cellulose; cellulose esters, such as cellulose nitrate which is particularly useful, cellulose acetate which is of limited compatibility; and such mixed esters or ether-esters as cellulose acetate-nitrate, cellulose acetate-propionate or ethyl cellulose-nitrate. The cellulose derivatives may be of various degrees of conversion, as, for example, cellulose nitrates of various nitrogen contents.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, soluble resins of the phenol-formaldehyde type. Non-resinous blending agents may be used when they yield homogeneous mixtures, and these may include hydrogenated castor oil, castor oil phthalate, lanolin or wool grease, ethyl abietate, methyl abietate, diethylene glycol rosinate, diethylene glycol hydrorosinate, or the like.

As illustrative examples of moistureproofing coating compositions which embody the principles of this invention, several specific examples, the proportions thereof being by weight, are hereinafter set forth, but they are not to be considered in any way as limitative of the scope of this invention.

*Table*

| | I | II | III | IV | V | VI | VII | VIII | IX | X | XI | XII | XIII | XIV | XV | XVI |
|---|---|---|---|---|---|---|---|---|---|---|---|---|---|---|---|---|
| *Solids* | | | | | | | | | | | | | | | | |
| Diphenyl crotonamide | 28 | | | | | | | | | | | | | | | |
| Diphenyl oleamide | | 24 | | | | | | | | | | | | | | |
| Diphenyl linoleic-oleamide* | | | 24 | | | | | | | | | | | | | |
| Diphenyl linolenamide | | | | 27 | | | | | | | | | | | | |
| Diphenyl C-20 acid amide** | | | | | 24 | | | | | | | | | | | |
| Diphenyl erucamide | | | | | | 24 | | | | | | | | | | |
| Diphenyl undecylenamide | | | | | | | 15 | | | | | | | | | |
| Diphenyl ricinoleamide | | | | | | | | 15 | | | | | | | | |
| Monophenyl ricinoleamide | | | | | | | | | 15 | | | | | | | |
| Monophenyl undecylenamide | | | | | | | | | | 18 | | | | | | |
| Monophenyl oleamide | | | | | | | | | | | 18 | | | | | 25 |
| Monophenyl linolenamide | | | | | | | | | | | | 20 | | | | |
| Monophenyl C-20 acid amide** | | | | | | | | | | | | | 15 | | | |
| Monophenyl acrylamide | | | | | | | | | | | | | | 15 | | |
| Paraffin, M. P. 60° C. | 3 | 4 | 3 | 4 | 3 | 4 | 4 | 4 | 4 | 4 | 4 | 4 | 4 | 4 | 4 | 2 |
| Dewaxed dammar | 7 | | 7 | | 7 | | | | | 15 | 15 | | | | | |
| Ester gum | | 15 | | 15 | | 15 | | | | | | 15 | 15 | 15 | | |
| Hydrogenated ester gum | | | | | | | 15 | 15 | 15 | | | | | | 15 | 15 |
| Nitrocellulose 11.4% N | 62 | | 66 | | 66 | | | | | | | | | | | |
| Nitrocellulose, 12.5% N | | 57 | | 54 | | 57 | | | | 63 | 63 | 61 | | | | |
| Ethyl cellulose | | | | | | | 66 | 66 | 66 | | | | 66 | 66 | 66 | |
| Cellulose acetate-butyrate | | | | | | | | | | | | | | | | 58 |
| *Solvent mixture* | | | | | | | | | | | | | | | | |
| Ethyl acetate | 475 | 452 | 475 | 452 | 475 | 452 | | | | 452 | 452 | 452 | | | | 198 |
| Isobutyl acetate | | | | | | | | | | | | | | | | 511 |
| Toluene | 233 | 256 | 233 | 256 | 233 | 256 | 584 | 584 | 584 | 256 | 256 | 256 | 584 | 584 | 584 | |
| Ethylene dichloride | | | | | | | | | | | | | | | | |
| Ethyl alcohol | 22 | 22 | 22 | 22 | 22 | 22 | 146 | 146 | 146 | 22 | 22 | 22 | 146 | 146 | 146 | |
| Isobutyl alcohol | | | | | | | | | | | | | | | | 21 |

*Prepared from a mixture of 60% linoleic acid—40% oleic acid.
**Prepared from unsaturated C-20 acids with 3 and 4 double bonds.

It is most convenient to apply the above moistureproofing coating compositions to base materials, such as sheets of regenerated cellulose, by means of suitable solvents. Thus, the film-forming ingredients, conveniently considered as solids, indicated in any of the above examples, may be dissolved to give a coating composition of appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent, flexible, moistureproof, coated base having good surface characteristics will be obtained. A suitable technique for this operation is set forth in the Charch & Prindle Patent No. 1,737,187.

The table hereinbefore set forth contains solvent compositions used in connection with the coating compositions of the examples. The solvent mixtures may be modified by the addition of other well-known lacquer solvents to obtain special drying effects without in any way affecting the properties of the plasticizers as set forth in this specification.

These moistureproofing compositions may be applied to various sheet materials to produce wrapping tissues which are flexible, moistureproof, and which exhibit highly improved surface characteristics including excellent surface slip and resistance to caking, sticking or marring during storage. A variety of base sheet materials may be used, such as cellulosic materials, paper, albuminous materials (gelatin, agaragar, casein), or films made from rubber derivatives, e. g., rubber hydrochloride, chlorinated rubber, or the material prepared by reacting rubber and a metal halide, such as boron trifluoride, stannous or stannic chloride, stannic acid, and other materials which are disclosed in an article by Thies and Clifford, in the "Journal of Industrial and Engineering Chemistry," vol. 26, page 123 (1934), the method of reacting the materials conforming to that disclosed in the said article referred to. In the preferred embodiment of the invention, a non-porous, non-fibrous, dense, smooth-surfaced and preferably transparent material, such as regenerated cellulose, cellulose ester films including cellulose nitrate and cellulose acetate, or cellulose ether films including ethyl cellulose, benzyl cellulose, glycol cellulose or lowly etherified cellulose, such as those in which there is only one substituent group for several glucose units of cellulose, is employed.

In the coating compositions set forth in the above examples, it is apparent that the proportions of the several ingredients may be varied over a considerable range. Thus, the cellulose derivative may comprise 30%–70% or more of the total solids, although in most instances 50%–70% will be found satisfactory, with approximately 60% a convenient and generally useful proportion. The ratio of cellulose derivative to blending agent may vary over a wide range from 2:1 to 10:1, or even greater, but for most purposes a ratio of from 3:1 to 9:1 is satisfactory, while a ratio of 4:1 is convenient and yields generally good results. The cellulose derivative is usually in excess of the total plasticizer content, and the ratio of cellulose derivative to plasticizer may vary from 1:1 to 6:1, but a ratio of 1–1½:1 to 4:1 is generally found to give the best results.

The blending agent may vary according to the cellulose derivative, plasticizer or moistureproofing agent employed, and it may constitute 1%–20% or more of the total solids. The ratio of blending agent to moistureproofing agent may vary from 1:5 or less to 5:1 or more, and usually a ratio of approximately 3:1 or 4:1 will be found satisfactory. The larger amounts of blending agent are usually used when the blending agent exerts some plasticizing action and can therefore replace a portion of the plasticizer.

The moistureproofing agent is usually present in a quantity sufficient to impart a suitable degree of moistureproofness while still maintaining homogeneity of composition, so that the ultimate moistureproofing coating on the moistureproof article prepared in accordance with the invention will be clear, transparent, non-greasy, non-smeary, and non-tacky under the normal conditions of handling or storage. Generally speaking, if the moistureproofing agent constitutes less than 10% of the total solids, these conditions will be fulfilled, but while 2%–6% of moistureproofing agent has been found to yield excellent results, it is to be understood that more or less may be used depending on the nature of the moistureproofing agent or the degree of moistureproofness desired.

The plasticizer may consist of an N-aryl (mono or poly) amide of an unsaturated aliphatic acid of the type previously mentioned or a mixture of plasticizers containing appreciable quantities of one or more specific compounds hereinbefore mentioned. The total plasticizer concentration may vary from 10%–60% of the total solids. Low percentages of plasticizer, however, are usually used only when the blending agent is capable of exhibiting a plasticizing action and therefore substitutes for a portion of plasticizer which might otherwise be added.

In the preceding discussion of the proportions of ingredients in the coating compositions, the ranges of percentage composition or ratio have been given to facilitate the formulation of highly satisfactory and preferred compositions and to aid one skilled in the art in quickly and easily arriving at operable compositions not specifically described in the examples. It is furthermore, however, to be understood that these limiting ranges are largely illustrative and do not restrict the invention beyond the limitations set forth in the appended claims.

Though the invention in its preferred embodiment relates to moistureproofing compositions and articles produced therefrom, the invention is not restricted thereto. The plasticizers may be used in cellulose derivative compositions for producing protective coatings and also in the production of cellulose derivative plastic or molding compositions. In the production of protective coatings (non-moistureproof coatings), the plasticizer may vary between 10%–75% of the total solids, but the range of 13%–30% will be generally satisfactory. In the case of plastics, the concentration of the plasticizer may vary from 10%–50% of the composition, or even greater, depending upon the cellulose derivative. The following examples illustrate the use of these plasticizers in protective coatings:

*Example 1*

| | Parts by weight |
|---|---|
| Cellulose nitrate | 12 |
| Gum dammar | 3 |
| Diphenyl linoleic-oleamide | 4 |
| Castor oil | 2.6 |
| Solvent | 166 |

*Example 2*

| | Parts by weight |
|---|---|
| Ethyl cellulose | 12 |
| Diphenyl C-20 acid amide | 4 |
| Solvent | 80 |

The following examples illustrate plastic or molding compositions:

*Example 3*

| | Parts by weight |
|---|---|
| Cellulose acetate | 100 |
| Diphenyl C-20 acid amide | 40 |

*Example 4*

| | Parts by weight |
|---|---|
| Cellulose nitrate | 100 |
| Diphenyl linoleamide | 60 |

*Example 5*

| | Parts by weight |
|---|---|
| Ethyl cellulose | 100 |
| Monophenyl ricinoleamide | 15 |

Since it is obvious that various changes and modifications may be made in the above description without departing from the nature or spirit thereof, this invention is not restricted thereto except as set forth in the appended claims.

I claim:

1. A composition of matter comprising a cellulose derivative and as a plasticizer an aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

2. A composition of matter comprising a cellulose derivative and as a plasticizer a monoaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

3. A composition of matter comprising a cellulose derivative and as a plasticizer a polyaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

4. A composition of matter comprising a cellulose derivative and as a plasticizer an N-substituted aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

5. A composition of matter comprising a cellulose derivative and as a plasticizer an N-substituted monoaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

6. A composition of matter comprising a cellulose derivative and as a plasticizer an N-substituted diaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

7. A composition of matter comprising a cellulose derivative and as a plasticizer an N-phenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

8. A composition of matter comprising a cellulose derivative and as a plasticizer an N-monophenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

9. A composition of matter comprising a cellulose derivative and as a plasticizer an N-diphenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

10. A composition of matter comprising a cellulose derivative and as a plasticizer diphenyl oleamide, said cellulose derivative being selected from the class which consists of cellulose esters, cellulose ethers and cellulose ether-esters.

11. A composition of matter comprising a cellulose derivative and as a plasticizer monophenyl oleamide, said cellulose derivative being selected from the class which consists of cellulose esters, cellulose ethers and cellulose ether-esters.

12. A composition of matter comprising a cellulose derivative and as a plasticizer diphenyl linoleamide, said cellulose derivative being selected from the class which consists of cellulose esters, cellulose ethers and cellulose ether-esters.

13. A film-forming composition comprising a cellulose derivative, a moistureproofing agent, and as a plasticizer an N-substituted aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

14. A film-forming composition comprising a cellulose derivative, a moistureproofing agent, and as a plasticizer an N-substituted monoaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

15. A film-forming composition comprising a cellulose derivative, a moistureproofing agent, and as a plasticizer an N-substituted diaryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

16. A film-forming composition comprising a cellulose derivative, a moistureproofing agent, and as a plasticizer an N-phenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

17. A film-forming composition comprising a cellulose derivative, a moistureproofing agent, and as a plasticizer an N-monophenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

18. A film-forming composition comprising a cellulose derivative, a moistureproofing agent, and as a plasticizer an N-diphenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

19. A film-forming composition comprising a cellulose derivative, a moistureproofing agent, a blending agent, and as a plasticizer an N-substituted aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters, the ratio of the quantity of cellulose derivative to the quantity of blending agent being from 2:1 to 10:1.

20. A film-forming composition comprising a cellulose derivative, a moistureproofing agent, a blending agent, and as a plasticizer an N-substituted aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters, the ratio of the quantity of cellulose derivative to the quantity of plasticizer being from 1:1 to 6:1.

21. A film-forming composition comprising a cellulose derivative, a moistureproofing agent, a blending agent, and as a plasticizer an N-substituted aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters, the ratio of the quantity of blending agent to the quantity of moistureproofing agent being from 1:5 to 5:1.

22. A film-forming composition in which the solids comprise the following ingredients in approximately the following proportions, the proportions being by weight and based on the total solids content:

| | Per cent |
|---|---|
| Cellulose derivative | 30 to 70 |
| Plasticizer | 10 to 60 |
| Blending agent | 1 to 20 |
| Moistureproofing agent | Not over 10 | the plasticizer comprising an aryl amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

23. An article of manufacture comprising a base coated with a composition comprising a cellulose derivative and as a plasticizer an N-substituted aryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

24. An article of manufacture comprising a base coated with a composition comprising a cellulose derivative and as a plasticizer an N-substituted monoaryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

25. An article of manufacture comprising a base coated with a composition comprising a cellulose derivative and as a plasticizer an N-substituted polyaryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

26. An article of manufacture comprising a base coated with a composition comprising a cellulose derivative and as a plasticizer an N-phenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

27. An article of manufacture comprising a base coated with a composition comprising a cellulose derivative and as a plasticizer an N-monophenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

28. An article of manufacture comprising a base coated with a composition comprising a cellulose derivative and as a plasticizer an N-diphenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

29. An article of manufacture comprising a base sheet formed of a transparent, non-fibrous material coated with a transparent moistureproofing composition comprising a cellulose derivative, a moistureproofing agent and as a plasticizer an N-substituted aryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

30. An article of manufacture comprising a base sheet formed of a transparent, non-fibrous material coated with a transparent moistureproofing composition comprising a cellulose derivative, a moistureproofing agent and as a plasticizer an N-substituted monoaryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

31. An article of manufacture comprising a base sheet formed of a transparent, non-fibrous material coated with a transparent moistureproofing composition comprising a cellulose derivative, a moistureproofing agent and as a plasticizer an N-substituted polyaryl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

32. An article of manufacture comprising a base sheet formed of a transparent, non-fibrous material coated with a transparent moistureproofing composition comprising a cellulose derivative, a moistureproofing agent and as a plasticizer an N-phenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

33. An article of manufacture comprising a base sheet formed of a transparent, non-fibrous material coated with a transparent moistureproofing composition comprising a cellulose derivative, a moistureproofing agent and as a plasticizer an N-monophenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

34. An article of manufacture comprising a base sheet formed of a transparent, non-fibrous material coated with a transparent moistureproofing composition comprising a cellulose derivative, a moistureproofing agent and as a plasticizer an N-diphenyl derivative of an amide of an unsaturated aliphatic acid containing 3 to 24 carbon atoms, said plasticizer being per se non-moistureproofing, and said cellulose derivative being selected from the class which consists of cellulose esters, cellulose ethers and cellulose ether-esters.

35. An article of manufacture comprising a base coated with a composition comprising a cellulose derivative and as a plasticizer diphenyl oleamide, said cellulose derivative being selected from the class which consists of cellulose esters, cellulose ethers and cellulose ether-esters.

36. An article of manufacture comprising a base coated with a composition comprising a cellulose derivative and as a plasticizer monophenyl oleamide, said cellulose derivative being selected from the class which consists of cellulose esters, cellulose ethers and cellulose ether-esters.

37. An article of manufacture comprising a base coated with a composition comprising a cellulose derivative and as a plasticizer diphenyl linoleamide, said cellulose derivative being selected from the class which consists of cellulose esters, cellulose ethers and cellulose ether-esters.

38. An article of manufacture comprising a base sheet formed of a transparent, non-fibrous material coated with a transparent, moistureproofing composition comprising the following ingredients in the approximate proportions set forth, the proportions being by weight:

| | Per cent |
|---|---|
| Nitrocellulose (12.5% N) | 57 |
| Ester gum | 15 |
| Paraffin (M. P. 60° C.) | 4 |
| Diphenyl oleamide | 24 |

39. An article of manufacture comprising a base sheet formed of a transparent, non-fibrous material coated with a transparent, moistureproofing composition comprising the following ingredients in the approximate proportions set forth, the proportions being by weight:

| | Per cent |
|---|---|
| Nitrocellulose (12.5% N) | 54 |
| Ester gum | 15 |
| Paraffin (M. P. 60° C.) | 4 |
| Diphenyl linoleamide | 27 |

40. An article of manufacture comprising a base sheet formed of a transparent, non-fibrous material coated with a transparent, moistureproofing composition comprising the following ingredients in the approximate proportions set forth, the proportions being by weight:

| | Per cent |
|---|---|
| Nitrocellulose (12.5% N) | 63 |
| Dewaxed dammar | 15 |
| Paraffin (M. P. 60° C.) | 4 |
| Monophenyl oleamide | 18 |

JAMES A. MITCHELL.